UNITED STATES PATENT OFFICE.

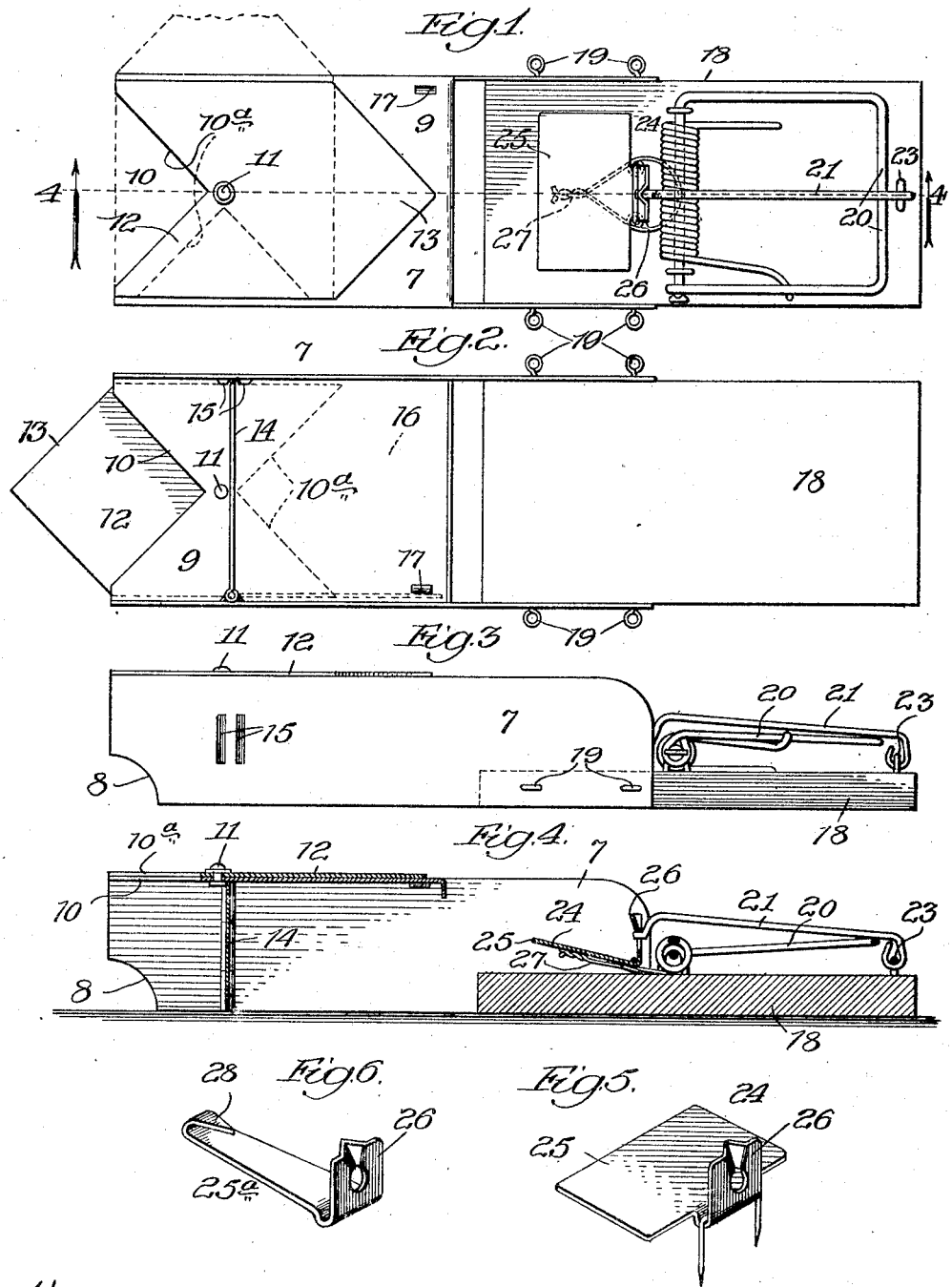

ERNEST L. SPANGLER, OF CHICAGO, ILLINOIS.

ANIMAL-TRAP.

1,275,993.  Specification of Letters Patent.  Patented Aug. 13, 1918.

Application filed June 15, 1918. Serial No. 240,129.

*To all whom it may concern:*

Be it known that I, ERNEST L. SPANGLER, a citizen of the United States, residing at Chicago, in the county of Cook and State of Illinois, have invented a new and useful Improvement in Animal-Traps, of which the following is a specification.

My invention relates to an improvement in the type of animal-traps, and more particularly in such traps as are designed for catching rats and mice, involving a housing adapted, for covering a hole through which the animal gains egress, to be fitted at one end into a corner in a room or the like, as well for covering such a hole in the floor remote from a corner.

In the accompanying drawing, Figure 1 is a top plan view of my improved animal-trap showing the pivotal angle-plate on the end of its top portion in one position of adjustment, and showing another position thereof by dotted representation; Fig. 2 is a bottom plan view of the same, showing the angle-plate in still another of its positions of adjustment; Fig. 3 is a view of the trap in side elevation; Fig. 4 is a section on line 4—4, Fig. 1; Fig. 5 is a perspective view of a trip-platform feature of my improved trap; and Fig. 6 is a perspective view of a modified form of the trip-platform device.

The housing 7, which may be best formed of sheet-metal, has parallel sides, preferably provided with corresponding end-recesses at 8, for the purpose hereinafter explained; an open bottom, and a top 9 rigidly joining the sides and extending from their extreme rear ends short of their forward ends, which are shown to have rounded corners. The rear end of the top has a recess 10 formed in it, preferably of the V-shape illustrated. Near the apex of this recess is pivoted at its center to the top, at 11, thus nearer the recessed end of the latter than its forward end, a plate 12, preferably formed of sheet metal. One end of the plate, the side-edges of which are straight, is tapered to form a V-shaped extension 13 to project beyond the recessed end of the housing-top when the plate is turned on its pivot to the position illustrated by full lines in Fig. 2, wherein it covers the recess 10. The opposite end of the plate contains a recess 10$^a$ conforming in shape to that of the recess 10 and adapted to register with the latter when the plate is turned to the full-line position represented in Fig. 1. A gate 14 is hinged at one edge to the inner face of one of the housing-sides to extend transversely across the housing close to the pivot 11 and releasably engages its free edge with a catch 15 provided in proper position in the opposite housing-side; and when this gate is swung on its hinge in the direction indicated by the dotted line at 16, Fig. 2, to extend lengthwise of the housing it releasably engages a catch 17 on the side of the housing against which it is thus turned.

In a trap of the present type, the housing has extending forwardly from it a runway 18, usually a flat rectangular strip of wood fastened at its rear-end portion between the forward ends of the housing-sides, as by screw-eyes 19. On the upper surface of this board 18 is secured a spring-pressed striker-arm 20 of a well-known construction ordinarily provided in the present type of traps, and therefore not described in detail herein, the arm being set by turning it to extend forwardly, thereby tensioning the coiled spring on its rear shaft-like end and being held in that position by a link or latch 21 fastened at its forward end, as by a staple driven into the runway at 23, and adjusted to extend over and across the striker and engage its opposite end with a catch. My improvement in this connection relates to the manner I have devised for spring-supporting the catch to facilitate engaging the link 21 in setting the striker-device. The catch shown at 24 is in the form of a platform 25, having on its forward edge an upwardly projecting perforated lip 26, at which it is hingedly stapled to the board 18, to extend in position to be engaged at its perforation by the latch 21 in setting the striker. A light spring 27 is confined on the runway 18 to press upwardly against the platform 25 and tend to tilt the lip 26 forwardly into the path of the free end of the latch 21, which it will thus automatically catch in adjusting it for the setting purpose, but which will, owing to the light quality of the spring 27, be withdrawn to release the latch and thus free the spring of the striker-arm to recoil, by slight pressure on the platform 25. In Fig. 6, the perforated catch-lip 26 is shown to be provided on the forward end of a relatively narrow platform or strip 25$^a$, having a bait-hook 28 on its opposite end.

When a rat or mouse-hole to be covered by the housing is in a floor near a wall, the trap is placed over it, the gate 14 being then in its closed position illustrated by the full lines in Fig. 2 and the angle-plate 12 adjusted on its pivot, to the position indicated by its dotted representation in Fig. 1; and in that position the recesses 8 in the housing-sides fit over the quarter-round at the wall-base to enable the trap to be set snugly againt the wall. A rodent emerging from the hole into the housing will run through it, particularly when attracted by bait on the hook 28, and by pressing on the platform 25 or 25ª, will withdraw the lip 26 from and thus release the latch 21 to free the preparatorily tensioned striker-spring to recoil and strike the animal with the arm 20 to kill it. In the described operative condition of the trap, it may be placed to extend with either side (with the plate 12 adjusted to project its end 13 beyond the opposite side) lengthwise along and close to the base of a wall for covering an adjacent hole; or over a hole in the floor remote from the wall.

When the hole in a floor is close to the corner of a room the trap, set as described but with the gate 14 open and the plate 12 adjusted, as represented in Fig. 2, to extend its V-shaped end 13 over the recess 10 and project it beyond the latter, is placed to introduce the projecting end of the plate into the corner and thus extend thereinto the housing effect. For placing the trap over a hole adjacent to a projecting corner, such as that of a door-frame, a disk or the like, the parts are in the condition last described, except that the plate 12 is adjusted into the position of its full-line representation in Fig. 1, to register the end-recess 10ª in the plate with the recess 10 in the housing-top, thereby to permit such corner to enter the coincident recesses and the trap to be properly placed for its housing purpose.

I realize that considerable variation is possible in the details of construction thus specifically shown and described, and I do not intend by illustrating a single specific or preferred embodiment of my invention to be limited thereto; my intention being in the following claims to claim protection upon all there may be of novelty in my invention as broadly as the state of the art will warrant.

I claim:

1. An animal-trap having an open-bottomed housing provided with a recess in the rear end of its top, and a plate on said top having a recess in one end and an angular projection on its opposite end and adjustable to register its recess with that in the top and to extend its said projection over and beyond said top-recess.

2. An animal-trap having an open-bottomed housing provided with a recess in the rear end of its top, and a plate pivoted on said top having a recess in one end and an angular projection on its opposite end and adjustable by turning on the pivot to register its recess with said top-recess, to extend its said projection rearwardly over and beyond said top-recess, and to extend the plate over said top-recess crosswise of said top, and a gate in the housing.

3. An animal-trap having an open-bottomed housing provided with a recess in the rear end of its top, a plate on said top having a recess in one end and an angular projection on its opposite end and adjustable to register its recess with said top-recess, to extend its said projection rearwardly over and beyond said top-recess, and to extend the plate over said top-recess crosswise of said top.

4. An animal-trap having an open-bottomed housing provided with a V-shaped recess in the rear end of its top, and a plate pivoted on said top having a V-shaped recess in one end and a V-shaped projection on its opposite end and adjustable by turning on its pivot to register its recess with said top-recess, to extend its said projection rearwardly over and beyond said top-recess, and to extend the plate over said top-recess crosswise of said top, and a gate in the rear end of the housing hinged to one of the housing-sides.

5. An animal-trap comprising an open-bottomed housing, a runway extending from the forward end of the housing, a spring-pressed striker-arm on the runway provided with a latch for securing it in the tensioned condition of the spring, a catch pivotally supported on the runway in position to be engaged by said latch when extended across the striker-arm, and a light spring bearing against said catch to maintain it normally in forwardly tilted position.

6. An animal-trap comprising an open-bottomed housing, a runway extending from the forward end of the housing, a spring-pressed striker-arm on the runway provided with a latch for securing it in the tensioned condition of the spring, a pivotal catch comprising a platform provided with a forwardly and upwardly projecting lip to engage the latch when extended across the striker-arm, and a light spring bearing upwardly against said platform to maintain the catch normally in forwardly tilted position.

ERNEST L. SPANGLER.